Patented Jan. 14, 1947

2,414,391

UNITED STATES PATENT OFFICE 2,414,391

MANUFACTURE OF ARTICLES OF RUBBERLIKE MATERIAL

Charles R. Peaker, Union City, Conn., assignor to United States Rubber Company, New York, N. Y., a corporation of New Jersey No Drawing. Application March 4, 1943, Serial No. 478,031

12 Claims. (Cl. 18—58)

This invention relates to the manufacture of articles of rubber-like material, and more particularly to improving the tensile strength of articles directly deposited from aqueous dispersions of rubber-like copolymers of butadiene and a monovinyl compound which is copolymerizable, therewith, such as styrene or acrylic nitrile.

Synthetic rubber-like materials, or so-called artificial rubbers, which are copolymers of butadiene and another polymerizable material, such as monovinyl compound, e. g., styrene, alkyl styrene, acrylic nitrile, alkyacrylic nitrile, generally in the range of 40 to 90 parts of butadiene per 100 parts of the mixture of polymerizable materials, are known. Aqueous dispersions of such synthetic rubber-like materials are formed in a known manner by the emulsion-copolymerization in an aqueous medium of the butadiene and monovinyl compound. Such aqueous dispersions of these synthetic rubber-like materials when compounded with the usual vulcanizing agents and accelerators, and dried to form a film and vulcanized, give stocks which have very low tensile strengths. It is necessary to materially improve the tensile strength of articles that are deposited directly from aqueous dispersions of copolymers of butadiene and monovinyl compounds.

I have discovered that the addition of water-insoluble clay to such an aqueous dispersion of a copolymer of butadiene and a monovinyl compound increases the tensile strength of articles deposited directly from the artificial rubber dispersion. Improvements in tensile strength up to 100% to 200% are possible with loadings of up to 50 parts of clay per 100 parts of copolymer solids of dispersions of copolymers of butadiene and styrene and improvements in tensile strength up to 300% with similar loadings of aqueous dispersions of copolymers of butadiene and acrylic nitrile. The term "water-insoluble clay" refers to those clays that are essentially insoluble or nonswellable in water, such as kaolin and the non-colloidal or so-called hard clays, for example, those known as Dixie Par, Suprex, Crown, Catalpo and Anchor clays, and exclude the hydrophilic colloidal clays, such as bentonite and wilkinite, which have the property of being readily swelled in water.

The article may be directly deposited from an aqueous dispersion of such synthetic rubber-like material containing the clay and vulcanizing ingredients, in any of the conventional ways of manufacturing articles directly from rubber latex, as for example, by dipping a form into the dispersion, or spraying the dispersion onto a form, or by spreading the dispersion on a belt or so-called blanket, if the article is to be a sheet, and drying, and vulcanizing. The deposition on a form may be speeded up, as in conventional rubber latex practices, by treating the form first with a coagulant for the dispersion, and then dipping into the dispersion of rubber-like material, or by dipping first in the dispersion, then coagulating the film by dipping the form into the coagulant, and again dipping in the dispersion and allowing the form to remain in the dispersion until the desired thickness of rubber-like material has been built up. These manipulative procedures for directly depositing rubber articles directly from latex are well known, and similar methods may be utilized in depositing articles directly from dispersions of these synthetic rubber-like materials. If desired, the article may be composed wholly of the synthetic rubber-like material directly deposited from the dispersion or it may be in the form of a base material coated with, or otherwise having attached thereto, such direct deposit of an aqueous dispersion of the synthetic rubber-like material.

The improvement in tensile strength of films deposited from aqueous dispersions of copolymers of butadiene and a monovinyl compound by the addition of water-insoluble clay to the dispersion, is illustrated in the following examples:

Example I

A dispersion was prepared by the conjoint emulsion-polymerization in an aqueous medium of 75 parts of butadiene-1,3 and 25 parts of styrene in the presence of 5 parts of soap (commercial "Ivory Soap Flakes"). The dispersion had a solids content of 16.4%. This dispersion was concentrated by adding 2.1 parts of a 2% aqueous solution of ammonium alginate and 4.9 parts of a 10% aqueous solution of potassium hydroxide per 100 parts of dispersion, and allowing to stand 8 days, whereupon the dispersion creamed and a supernatant layer of 41.5% solids content cream was removed from the serum portion. To 240 parts by weight of the 41.5% solids content cream, as prepared above, was added a 24 hour ball-milled paste of vulcanizing ingredients comprising:

| | Parts by weight |
|---|---|
| Sulphur | 2 |
| Zinc oxide | 3 |
| Zinc mercaptobenzothiazole (accelerator) | 1.5 |
| Zinc dibutyldithiocarbamate (accelerator) | 1 |
| Commercial dispersing agents | .6 |
| Water | 5.9 |

A 40% water-insoluble clay dispersion was prepared by ball-milling 100 parts by weight of Suprex clay together with 144 parts of water and 6 parts of commercial dispersing agent for 24 hours. To portions of the above compounded dispersion of the copolymer were added various amounts of this clay dispersion to give different proportions of clay to dispersion solids, as shown in the table below. Test films were prepared in this and the following examples by spreading the dispersion compounds on level glass plates and drying over night at room temperature (70° to 80° F.) giving a thickness of about 0.015 inch. The films were then stripped from the glass plates, dusted to prevent sticking together, and vulcanized in an air oven at 100° C. Results (averages of a range of cure) of measurements of modulus at 200% elongation, tensile strength, and elongation at break of test pieces cut from the vulcanized films, together with the percent of permanent set, measured immediately after breaking the test strip, are tabulated below:

| Percent clay on the copolymer solids | Modulus at 200% elongation, lbs. per sq. in. | Tensile strength, lbs. per sq. in. | Ultimate elongation, percent | Permanent set, percent |
|---|---|---|---|---|
| 0 | 197 | 399 | 460 | 13 |
| 10 | 313 | 484 | 429 | 13 |
| 24 | 348 | 649 | 476 | 21 |
| 50 | 473 | 826 | 589 | 41 |
| 100 | 644 | 740 | 340 | 34 |

*Example II*

In this case a commercial aqueous dispersion of 38.5% total solids content resulting from the emulsion-copolymerization of butadiene-1,3 and acrylic nitrile (sold under the trade name "Hycar OR Latex") was concentrated to 53.1% total solids by creaming in a manner similar to the creaming of the dispersion in Example I with .16 part of ammonium alginate and 1.2 parts potassium hydroxide per 100 parts of the dispersion. To 190 parts by weight of the 53.1% solids content cream was added the ball-milled paste of vulcanizing ingredients of Example I, and to various portions of the thus compounded dispersion were added various amounts of the clay dispersion of Example I. Test films were prepared as above described and tested with the following results:

| Percent clay on the copolymer solids | Modulus at 200% elongation, lbs. per sq. in. | Tensile strength, lbs. per sq. in. | Ultimate elongation, percent | Permanent set, percent |
|---|---|---|---|---|
| 0 | 202 | 556 | 459 | 12 |
| 10 | 320 | 1,260 | 576 | 18 |
| 24 | 495 | 1,345 | 476 | 22 |
| 50 | 1,019 | 1,528 | 399 | 28 |

It may be seen from Examples I and II that very definite improvements in tensile strength and modulus are imparted to articles deposited directly from aqueous dispersions of copolymers of butadiene and other polymerizable materials, such as styrene and acrylic nitrile, by the addition of water-insoluble clay. There is little or no sacrifice in breaking elongation. With natural rubber latex, on the other hand, the addition of water-insoluble clays decreases considerably both the tensile strength and elongation at break as shown in the following table where various amounts of Suprex clay comparable to those used in Examples I and II were added to a conventionally compounded natural rubber latex which was dried and vulcanized, and from the films of which test pieces were prepared and tested as above:

| Per cent clay on the rubber solids | Tensile strength, lbs. per sq. in. | Ultimate elongation, per cent |
|---|---|---|
| 0 | 4,244 | 863 |
| 10 | 3,620 | 807 |
| 25 | 2,705 | 733 |
| 50 | 1,598 | 517 |
| 100 | 1,523 | 330 |

It is evident that the effects of the addition of the water-insoluble clays are entirely different in natural rubber latex and in aqueous dispersions of copolymers of butadiene and monovinyl compounds. It is noted that the addition of water-insoluble clay to the aqueous dispersion of copolymers of butadiene and monovinyl compounds increases to some extent the permanent set but where such an increase in permanent set is not objectionable, or where the increase in the tensile strength is sufficient to overcome possible objections to increased permanent set, the present invention is of definite advantage.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Method of making articles of rubber-like materials which comprises directly depositing in the desired shape the solids of an aqueous dispersion of a copolymer of butadiene and a monovinyl compound, said dispersion containing water-insoluble clay, drying and vulcanizing.

2. Method of making articles of rubber-like materials which comprises directly depositing in the desired shape the solids of an aqueous dispersion of a copolymer of butadiene and a monovinyl compound, said dispersion containing up to 50 parts water-insoluble clay per 100 parts of copolymer, drying and vulcanizing.

3. Method of making articles of rubber-like materials which comprises directly depositing in the desired shape the solids of an aqueous dispersion of a copolymer of butadiene and styrene, said dispersion containing water-insoluble clay, drying and vulcanizing.

4. Method of making articles of rubber-like materials which comprises directly depositing in the desired shape the solids of an aqueous dispersion of a copolymer of butadiene and styrene, said dispersion containing up to 50 parts water-insoluble clay per 100 parts of copolymer, drying and vulcanizing.

5. Method of making articles of rubber-like materials which comprises directly depositing in the desired shape the solids of an aqueous dispersion of a copolymer of butadiene and acrylic nitrile, said dispersion containing water-insoluble clay, drying and vulcanizing.

6. Method of making articles of rubber-like materials which comprises directly depositing in the desired shape the solids of an aqueous dispersion of a copolymer of butadiene and acrylic nitrile, said dispersion containing up to 50 parts water-insoluble clay per 100 parts of copolymer, drying and vulcanizing.

7. A shaped article comprising the direct deposit of solids of an aqueous dispersion of a copolymer of butadiene and a monovinyl compound, said dispersion containing water-insoluble clay.

8. A shaped article comprising the direct deposit of solids of an aqueous dispersion of a copolymer of butadiene and a monovinyl compound, said dispersion containing up to 50 parts of water-insoluble clay per 100 parts of copolymer.

9. A shaped article comprising the direct deposit of solids of an aqueous dispersion of a copolymer of butadiene and styrene, said dispersion containing water-insoluble clay.

10. A shaped article comprising the direct deposit of solids of an aqueous dispersion of a copolymer of butadiene and styrene, said dispersion containing up to 50 parts of water-insoluble clay per 100 parts of copolymer.

11. A shaped article comprising the direct deposit of solids of an aqueous dispersion of a copolymer of butadiene and acrylic nitrile, said dispersion containing water-insoluble clay.

12. A shaped article comprising the direct deposit of solids of an aqueous dispersion of a copolymer of butadiene and acrylic nitrile, said dispersion containing up to 50 parts of water-insoluble clay per 100 parts of copolymer.

CHARLES R. PEAKER.